UNITED STATES PATENT OFFICE.

LAURENCE G. WESSON, OF CHEVY CHASE, MARYLAND.

SULFUR-DIOXID-LIBERATING COMPOSITION.

1,356,030.   Specification of Letters Patent.   Patented Oct. 19, 1920.

No Drawing.   Application filed June 12, 1919. Serial No. 303,622.

*To all whom it may concern:*

Be it known that I, LAURENCE G. WESSON, a citizen of the United States of America, residing at Chevy Chase, in the county of Montgomery and State of Maryland, have invented certain new and useful Improvements in Sulfur-Dioxid-Liberating Compositions, of which the following is a specification.

The present invention relates to a composition suitable for liberating sulfur dioxid by reaction of its ingredients, and aims to produce such a composition which will be stable for a long period of time when kept out of contact with moisture.

Compositions have heretofore been proposed for liberating sulfur dioxid by reaction between a sulfite or bisulfite and an acid material, such reaction being induced by allowing water to come into contact with the material. In such compositions sodium sulfite or sodium bisulfite has been proposed as the source of material containing the $SO_2$ group, and sodium bisulfate has been proposed as the acid ingredient of the mixture. The present invention constitutes an improvement upon such compositions, by the employment as the acid material, of sodium pyrosulfate $Na_2S_2O_7$, the compound containing the $SO_2$ group preferably being sodium bisulfite or sodium meta bisulfite.

As specific examples of the present invention the following are given, the same being intended in illustrative and not in a restrictive sense.

Example 1: A dry mixture is made containing sodium pryosulfate and sodium bisulfite. It is preferred to employ a small excess, for example about 20% of sodium bisulfite, since this material is somewhat unstable and in the presence of air, even dry air, loses some of its $SO_2$ content, and also to a certain extent is oxidized by dry air, to sodium sulfate or bisulfate. The proportions indicated are approximately as follows: 250 parts by weight of sodium bisulfite and 222 parts by weight of sodium pyrosulfate.

Example 2: A dry mixture is produced containing sodium pyrosulfate and sodium meta bisulfite. Sodium meta bisulfite being stable in dry air, it is not entirely necessary to employ any excess of this material, but under some conditions an excess of say, 5% or less of this material may be used. This would correspond to a proportion of 190 parts of sodium meta bisulfite and 222 parts of sodium pyrosulfate.

Sodium pyrosulfate is extremely hygroscopic and takes up water from the atmosphere readily to first produce sodium bisulfate, which is also hygroscopic, and continues to take up water. This water causes the acid component of the sodium pyrosulfate to react with the sodium bisulfite or meta bisulfite to produce sodium sulfate and sulfur dioxid. The reactions which take place in the two examples may be expressed as follows:

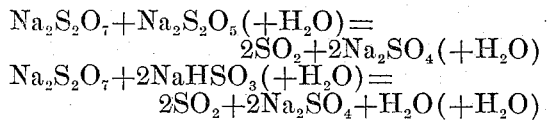

The material will readily take up a sufficient amount of moisture to produce, at the end of the operation, a pasty or liquid mass.

The dry and preferably pulverulent mixture can be used for the production of $SO_2$ for bleaching, disinfection or any other desired purpose, by merely pouring out a desired quantity of the same into a suitable open receptacle, and placing the same in a room which is to be disinfected, or by placing the same into a compartment containing moist or wet material which it is desired to bleach. It is not necessary to do anything further, but if rapid liberation of $SO_2$ is wanted, liquid water can be added to the mixture. In some cases also a greater excess of the bisulfite or meta bisulfite can be used in the first instance, and acidulated water can be added to the mixture. This, however, does not ordinarily possess any advantage except that the mixture contains a higher percentage of available $SO_2$. The mixture also can be made up into suitable cakes or blocks for convenience in using, when so desired.

The mixture can be kept for a nearly indefinite period in a dry atmosphere, and the material can be shipped in air-tight metal boxes or paraffined cartons, and will keep for a long period, especially when the meta bisulfite is used. It will accordingly be seen that I have, in accordance with the present invention, produced a stable, permanent, cheap and efficient material for the production of $SO_2$.

Sodium pyrosulfate possesses, for the purpose of producing compositions such as are herein described, a decided advantage over sodium bisulfate in that it carries, for the same actual weight, a greater percentage of potential sulfuric acid, and also the mixtures produced therewith are more stable for the reason that the material can take up from the atmosphere a certain amount of moisture, being thereby converted into sodium bisulfate before any reaction begins to take place, since the reaction can take place only when a sufficient amount of moisture has been absorbed to form some bisulfite from the pyrosulfate.

While I have referred in the above description, to the use of the sodium compounds, and these compounds are from a practical standpoint preferred on account of cheapness, the invention is not restricted to the use thereof, but the compounds of other metals, and especially of potassium can be used, if desired. In the appended claims the term "bisulfite" includes not only the ortho bisulfites ($MHSO_3$) but also partially or completely dehydrated bisulfites including the meta bisulfite $M_2S_2O_5$.

I claim:

1. A substantially dry composition of matter comprising a mixture consisting exclusively of a dry solid pyrosulfate and a dry bisulfite.

2. A composition of matter comprising an alkali metal pyrosulfate and an alkali metal bisulfite, the latter being present in an amount greater than the stoichiometrical quantity, such materials being both substantially water-free.

3. A dry mixture of sodium pyrosulfate and sodium bisulfite.

In testimony whereof I affix my signature.

LAURENCE G. WESSON.